(12) United States Patent
McCracken

(10) Patent No.: US 6,447,201 B1
(45) Date of Patent: Sep. 10, 2002

(54) QUICK LOAD RELIEF COUPLER

(75) Inventor: Robert G. McCracken, Des Moines, IA (US)

(73) Assignee: Wilian Holding Company, Des Moines, IA (US)

( * ) Notice: Subject to any disclaimer, the term of this patent is extended or adjusted under 35 U.S.C. 154(b) by 0 days.

(21) Appl. No.: 09/541,341

(22) Filed: Apr. 3, 2000

(51) Int. Cl.⁷ .................................................. F16B 7/04
(52) U.S. Cl. ............................... 403/374.2; 403/409.1; 403/97; 74/527; 74/326
(58) Field of Search .......................... 74/527, 528, 326; 403/373, 379.1, 374.2, 374.3, 297, 409.1, 83, 84, 97; 52/655.1, 656.9

(56) References Cited

U.S. PATENT DOCUMENTS

| | | | | |
|---|---|---|---|---|
| 295,922 | A | * 4/1884 | Hood | ........................ 403/97 |
| 2,545,843 | A | * 3/1951 | Cohan | ..................... 403/97 X |
| 5,133,553 | A | * 7/1992 | Divnick | .................... 403/97 X |

* cited by examiner

Primary Examiner—Lynne H. Browne
Assistant Examiner—John R. Cottingham
(74) Attorney, Agent, or Firm—Kent A. Herink, Esq.; Daniel A. Rosenberg, Esq.

(57) ABSTRACT

A load relief coupling device which interconnects a lower, supporting member and an upper, supported member of a concrete forming apparatus to permit quick and easy relief of the load on the members by a formed concrete structure. The load relief coupler includes a supporting coupler member, a supported coupler member, and an inner coupler member positioned between the supporting and supported coupler member. Coacting teeth on the inner coupler member and on the supporting and supported coupler members cause the coupler to move between a loaded, expanded position and an unloaded, collapsed position upon relative pivotal movement between the inner coupler member and the two supporting and supported coupler members. A connector is provided for releasably holding the supporting coupler member and the supported coupler member at the loaded position relative to the inner coupler member in a position wherein said connecting teeth support the inner coupler member a spaced distance from the supporting coupler member and the supported coupler member a spaced distance from the inner coupler member. Release of the connector permits the supported coupler member to move toward the supporting coupler member moving the load relief coupler to its unloaded, collapsed position relieving a substantial part of the load on the supporting member.

7 Claims, 6 Drawing Sheets

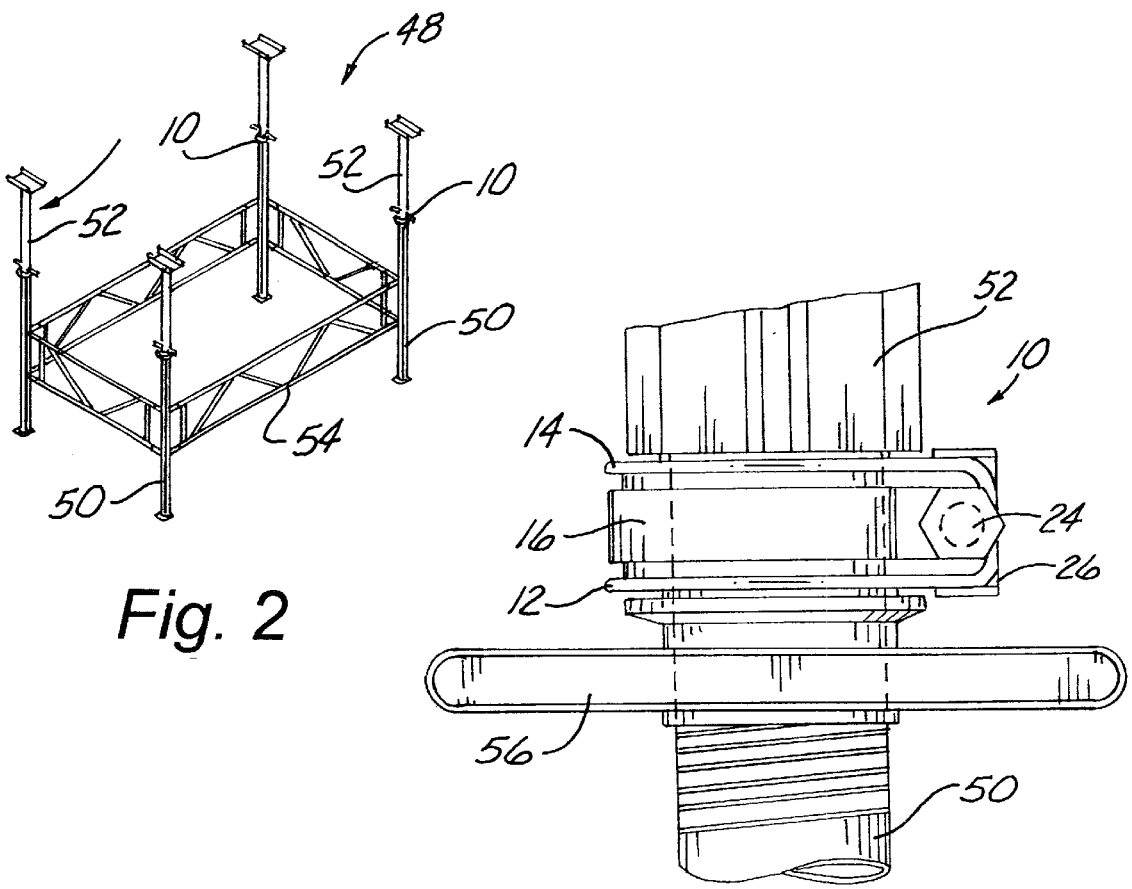
Fig. 2
Fig. 3
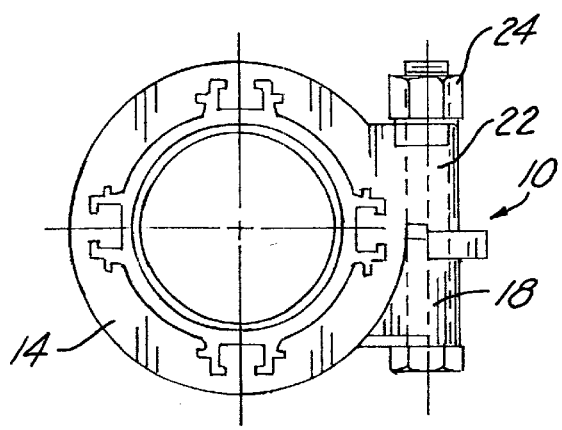
Fig. 4

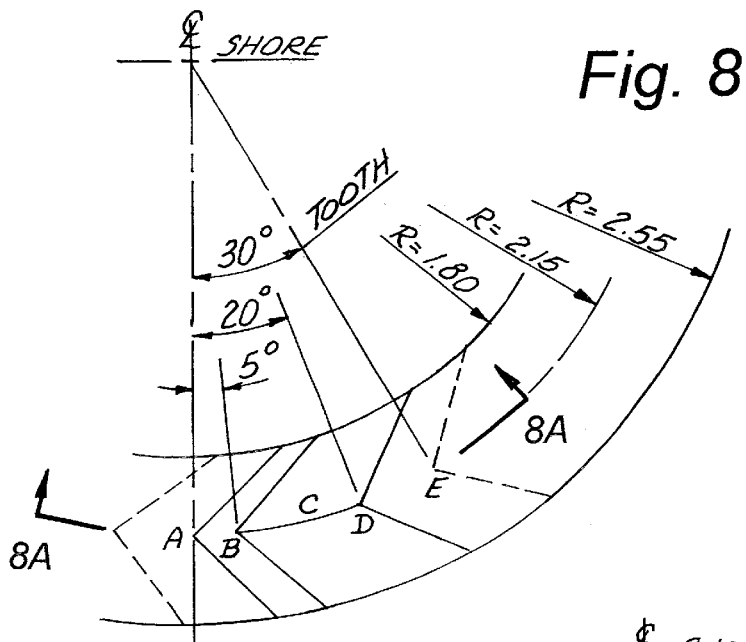
Fig. 8
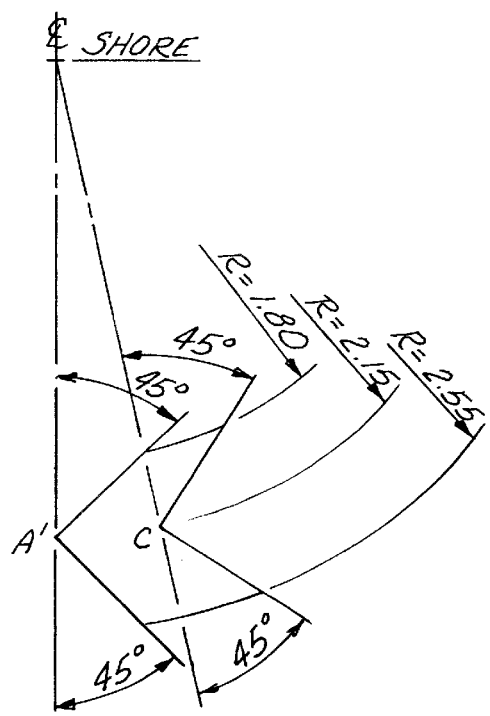
Fig. 8A
Fig. 8B

QUICK LOAD RELIEF COUPLER

BACKGROUND OF THE INVENTION

1. Field of the Invention

The invention relates generally to a load relief coupling for interconnecting and adjustably changing the distance of separation of two members of a supporting apparatus and, more specifically, to a load relief coupling device which interconnects a lower, supporting member and an upper, supported member of a concrete forming apparatus to permit quick and easy relief of the load on the members by a formed concrete structure.

2. Background of the Prior Art

Concrete forming apparatus is in wide use in the construction of buildings, bridges, and other concrete structures. The formwork against which the concrete is formed is often held in place by shoring apparatus. In forming horizontal concrete building sections, such as floors and the like, the substantially horizontally disposed formwork is supported on a plurality of vertical support members which are capable of withstanding the applied load of uncurred concrete poured upon the formwork. Once the poured concrete has set to a sufficient degree, the formwork is stripped from the concrete structure. Whether the concrete structure is substantially vertical or horizontal, or virtually any other orientation, it is frequently found that a substantial force is exerted by the formed concrete structure against the formwork and hence the structural members which support the formwork. By way of example, if the poured concrete structure is a horizontally disposed floor or ceiling, a significant proportion of the weight of the concrete structure will bear against the formwork and hence against the support members. Accordingly, in order to strip the formwork away from the poured concrete structure, it is necessary to reduce the vertical extension of the support members so as to be able to lower the formwork.

In the prior art, the formwork is commonly supported by a lower support member which supports an upper, supported member that is interconnected to the supporting member by a wing nut or the like. The wing nut is rotated relative to threads in the supporting and/or supported member to move the supporting and supported member relative to each other so as to reduce the vertical height of the support member and move the formwork away from the poured concrete structure. The load on the support member by the poured concrete structure, however, makes it extremely difficult to loosen the wing nut. It is common for workers to overcome this resistance by extending the lever arm for moving the wing nut by using a section of pipe connected to the wing nut and then either hammering on the pipe in order to forcibly move the wing nut or, in more difficult circumstances, using a fork lift or other powered device to push against the pipe and thereby forcefully rotate the wing nut to strip the formwork from the formed concrete structure. This way of stripping the formwork has several disadvantages. It is difficult for a single laborer to accomplish, it often requires the use of ancillary equipment, and it requires the exertion of extremely high forces on the support members.

SUMMARY OF THE INVENTION

The invention consists of a load relief coupling for interconnecting and adjustably changing the distance of separation of a lower supporting member and an upper supported member that are used to hold in position formwork of a concrete form apparatus. The lower supporting member and the upper supported member are moveable relative to each other along their common axis so as to increase or decrease their relative separation. The load relief coupling of the present invention is interposed between the supporting member and the supported member. In the load position, the load relief coupling has a pre-selected, increased width dimension and is quickly and easily adjusted to a released, decreased width configuration which releases the load interposed on the supporting member by the supported member.

The load relief coupling includes three members which in the preferred embodiment, have an annular ring structure. A lower, supported annular ring is in contact engagement with the supporting member and includes an opposing surface having a plurality of circumferentially teeth arranged which project in an upward direction. A second supporting annular ring includes a surface that is in contact engagement with the supported member and an opposing surface having a plurality of teeth arranged circumferentially and which project downwardly. The third annular ring is an inner annular ring that is positioned between the supporting and supported annular rings and includes a plurality of circumferentially arranged teeth which project in opposing arrangement and which are positioned to engage the corresponding teeth on the supporting and supported annular rings.

Each of the annular rings has a radially extended arm. A connector, such as a nut and bolt combination, is used to position the radially extended arm of the supporting member and the radially extended arm of the supported member in a pivoted position relative to the radially extended arm of the inner annular ring so that the mating teeth of the annular ring structures support or move the outer annular rings relative to inner annular ring to a loaded position wherein the outer annular rings are separated from each other and the inner annular ring by a pre-selected, large distance. Release of the connecting member will allow the teeth of the outer annular rings to move relative to the teeth of the inner annular ring, collapsing the two outer annular rings toward the inner annular ring, thereby reducing the combined width dimension of the load relief coupling. Accordingly, when used in an assembly with the lower, supporting member and the upper, supported member, release of the connector will reduce the relative separation distance of the supporting and supported member, thus relieving a substantial portion of the load on the support assembly so that the wing nut can be easily rotated by a single laborer to allow the supported formwork to be stripped away from the poured concrete structure.

In the preferred embodiment, the coacting teeth of the annular rings have a self-centering structure which helps to maintain the coaxial arrangement of the annular rings in the load relief coupling assembly. In particular, the teeth of inner annular ring have a helical chevron radial cross-section and the teeth of the outer annular ring have a corresponding, mating helical radial cross-section so that the teeth of the outer annular rings remain centered relative to the teeth of the inner annular ring.

An object of the present invention is to provide a load relief coupling for quickly reducing the relative separation distance of a supporting member and supported member which it interconnects.

Another object of the present invention is to provide a coupling which quickly and easily reduces the load between two support members of a support apparatus to allow removal of the support apparatus.

A further object of the present invention is to provide a quick load relief coupling that interconnects support members of a support apparatus for concrete formwork which permits quick and easy stripping of supported concrete formwork after the concrete has sufficiently cured.

These and other objects of the invention will be made apparent upon a review and understanding of this specification, the associated drawings, and the appended claims.

BRIEF DESCRIPTION OF THE DRAWINGS

FIG. 2 is a perspective view of a typical arrangement of a support apparatus for concrete forming apparatus in which the quick relief coupling of the present invention is utilized.

FIG. 3 is a side view of a supporting member, a supported member, and an interconnecting load relief coupler of the present invention shown in its loaded, or expanded width dimension, configuration.

FIG. 4 is a plan view corresponding to FIG. 3.

FIGS. 7a and 7b are cross-sectional drawings of load relief coupling, wherein FIG. 7a shows the load relief coupling in a load position and FIG. 7b shows the load relief coupling in an unloaded position.

FIG. 8 is a digrammatical representation of the dimensions of a tooth profile of a preferred embodiment wherein the coacting teeth of the quick relief coupling have a self-centering, helical configuration; FIG. 8A is a cross-sectional view taken along like A—A of FIG. 8; and FIG. 8B is a cross-sectional view taken along line B—B of FIG. 8A.

DETAILED DESCRIPTION OF PREFERRED EMBODIMENTS

Figure 1:
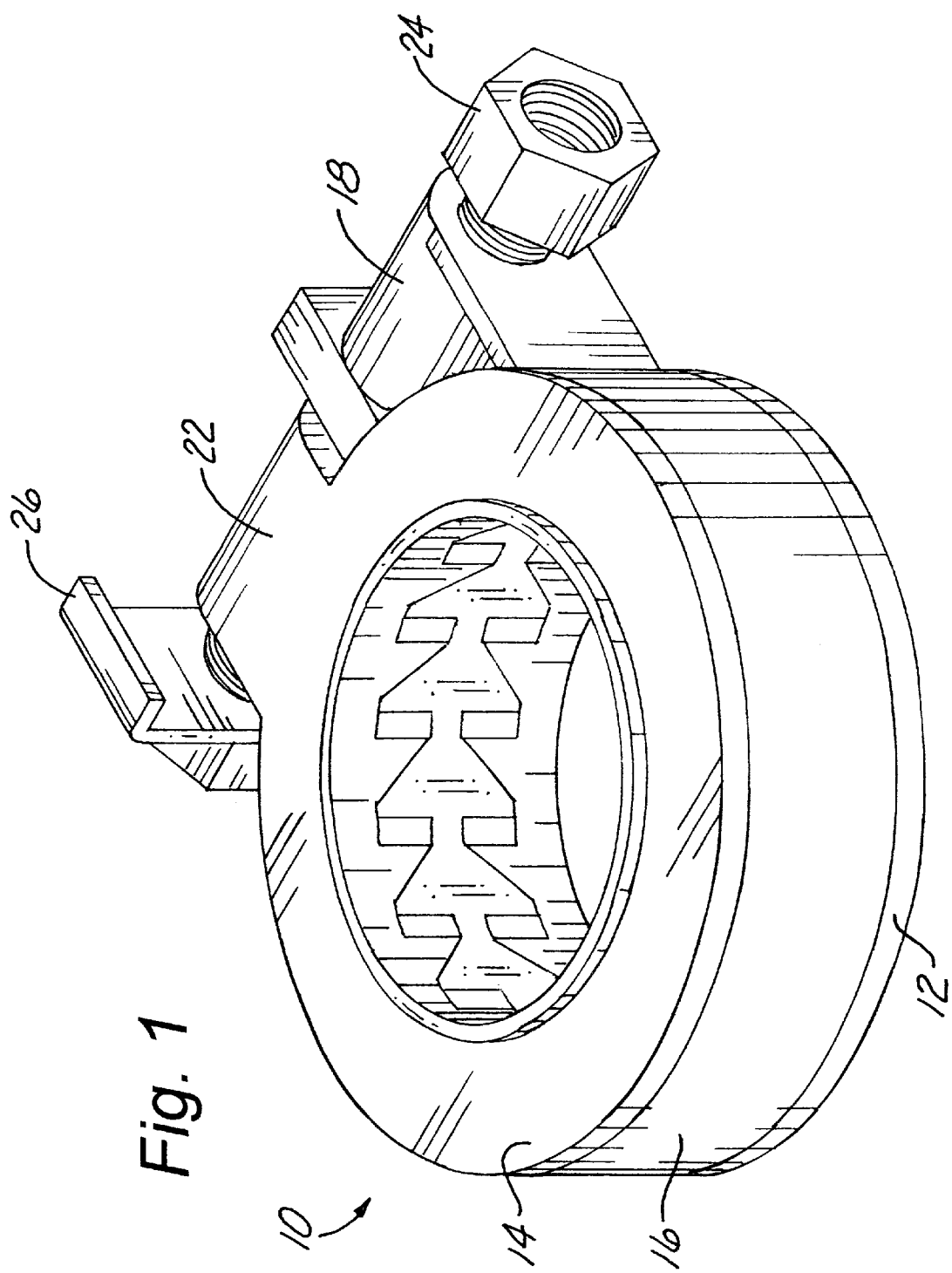
FIG. 1 is a perspective view of a quick relief coupling of the present invention.

Referring to FIG. 1, there is illustrated, generally at 10, a load relief coupling, which includes a lower annular ring 12 and upper annular ring 14, and an inner annular ring 16. The load relief coupling 10 is illustrated in its collapsed or load relief position having a smaller or reduced widthwise dimension.

Each of the annular rings 12–16 includes a radially extended arm, namely, guide arm 18 of the inner annular ring 16, lever arm 20 of the lower annular ring 12, and lever arm 22 of the upper annular ring 14. The guide arm 18 includes a throughbore in which is received a connector, which is illustrated as a nut and bolt combination 24. Also received about the nut and bolt combination is a generally U-shaped keeper member 26. The lever arms 20 and 22 combine to encircle 24 the nut and bolt combination 24 adjacent to the guide arm 18. Accordingly, tightening of the nut and bolt combination 24 will cause the lever arms 20 and 22 to move closer to the guide arm 18, and conversely. The keeper member 26 will limit the axial movement of the lower annular ring 12 and upper annular ring 14.

Figure 5:
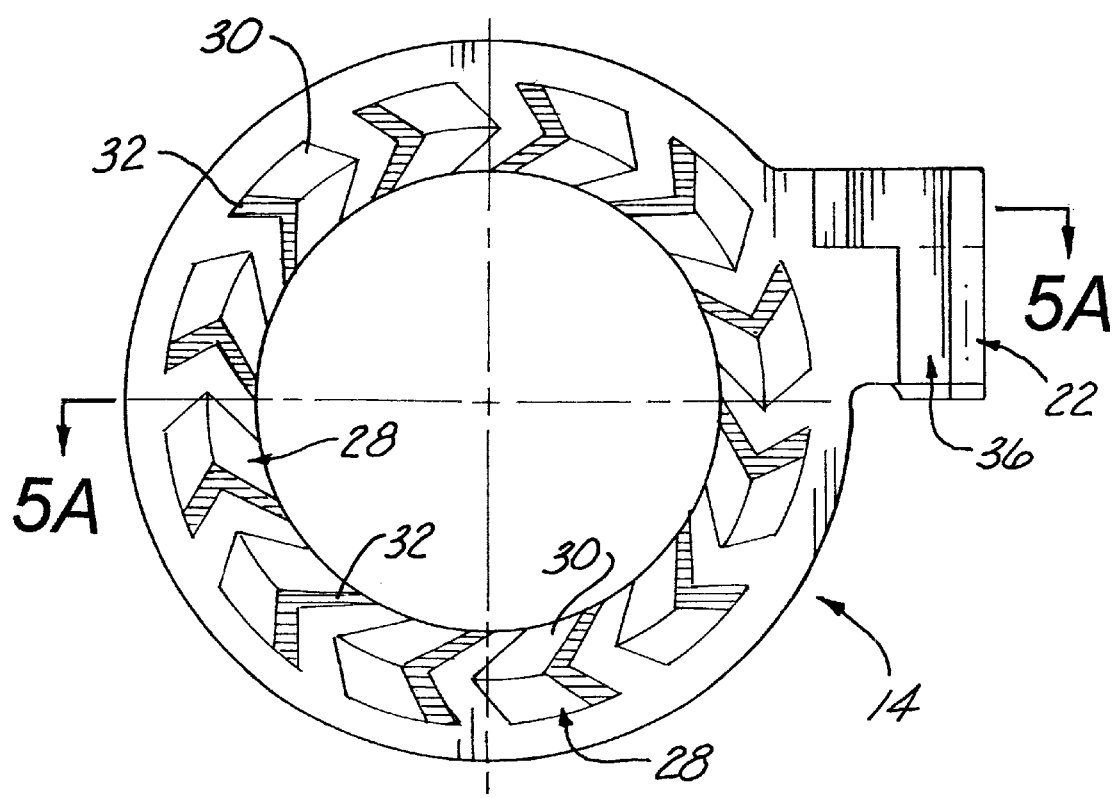
FIG. 5 is a plan view of a lower, annular ring of the present invention.
Figure 5A:
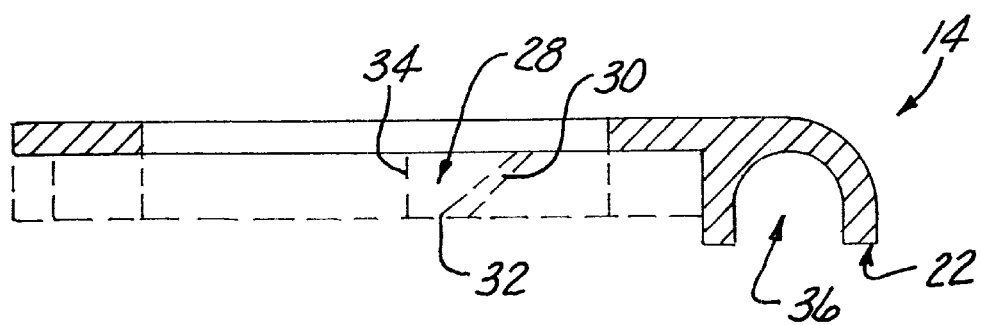
FIG. 5A is a cross-section taken along line A—A of FIG. 5.

An upper annular ring 14 of a preferred embodiment is illustrated in FIGS. 5 and 5A. The upper annular ring 14 includes a plurality of circumferentially disposed projecting teeth 28. The teeth 28 project downwardly from the upper annular ring 14 and have a ridged profile in radial cross-section, as best illustrated in FIG. 5A. More specifically, the teeth 28 have a ramped leading face 30 that has a central ridge so that it is peaked, a flat plateau or top 32 and an axial trailing face 34. Additionally, the lever arm 22 has a substantially half-tubular recess 36 in which is received the nut and bolt combination 24 as described previously.

It will be noted that the teeth 28 of the upper annular ring 14 are arranged so that the ramped faces 30 are positioned clockwise relative to the axial face 34 when viewed from the perspective of FIG. 5. The lower annular ring 12 is constructed identically to the upper annular ring 14 except that it is oppositely handed, by which it is meant that it is a mirror image of the upper annular ring 14 wherein the ramped leading face of its teeth is oriented counterclockwise relative to the axial face of the teeth.

Figure 6:
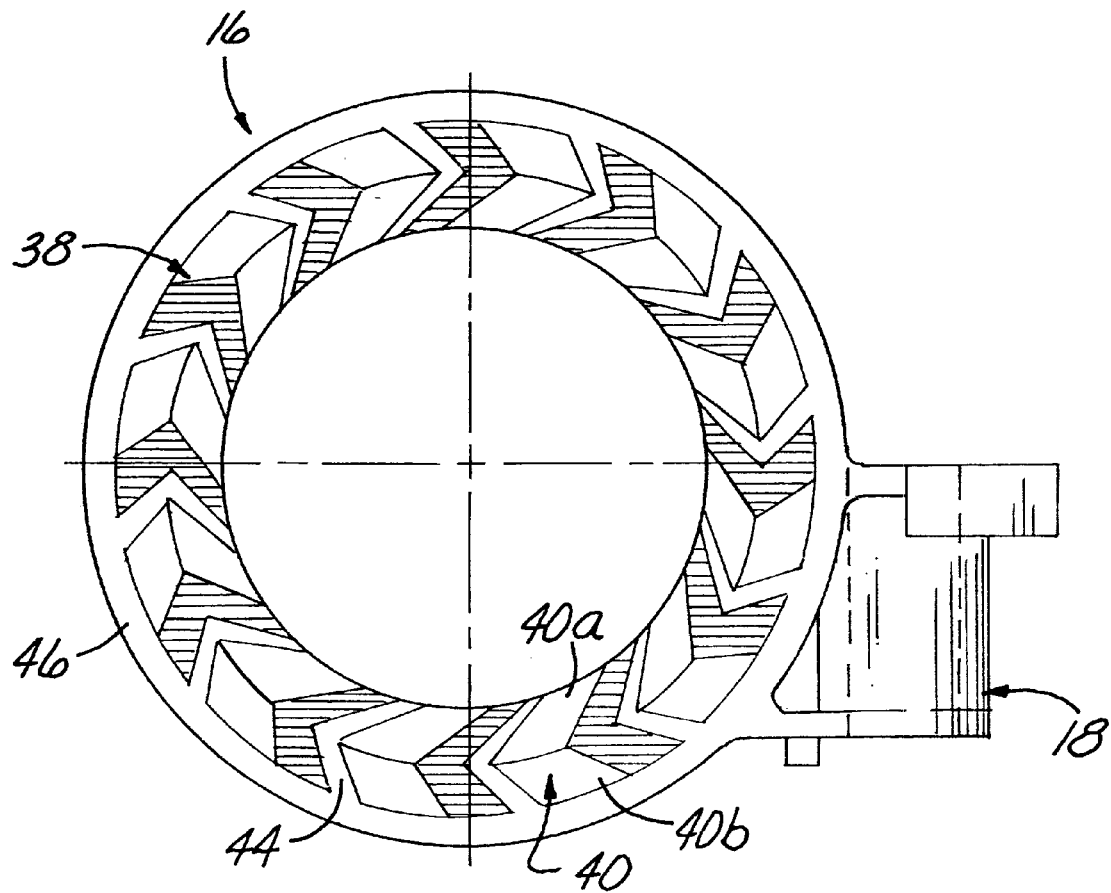
FIG. 6 is a plan view of an inner annular ring of the load relief coupling.
Figure 6A:
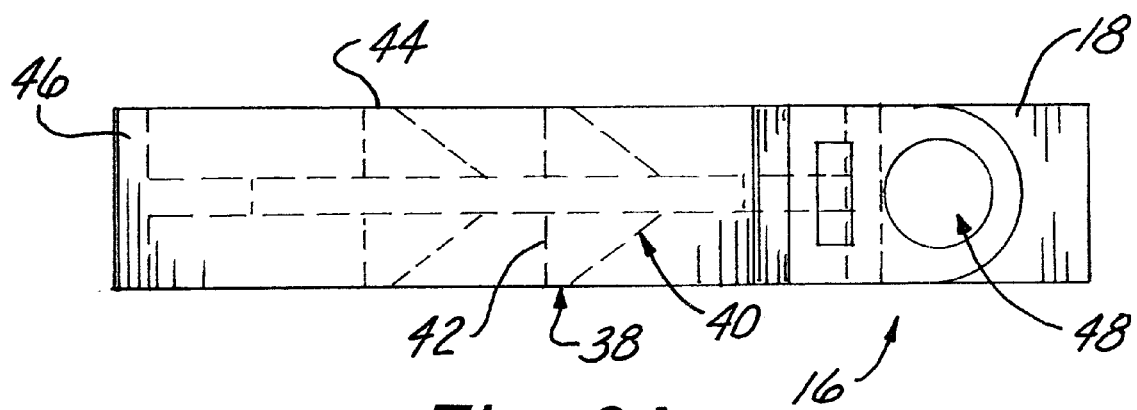
FIG. 6A is a cross-sectional view taken along lines A—A of FIG. 6.

The inner annular ring 16, as illustrated in FIGS. 6 and 6A, includes a plurality of circumferentially arranged teeth 38 that project outwardly from either side of the inner annular ring 16. Each of the teeth 38 has a leading face 40 comprised of a pair of inwardly sloping faces 40a and 40b and a trailing, axial face 42. Between the leading face 40 and the axial face 42 is a flat plateau or top 44 that is chevron-shaped in plan view. The teeth 38 are arranged in corresponding pairs on opposite side surfaces of the inner annular ring 16, as illustrated in FIG. 6A, so that the leading faces 40 on one side of the inner annular ring 16 fall in a clockwise direction on one side and fall in a counterclockwise direction on the opposite side.

The dimensions of a tooth profile of the teeth 38 representative of an emodiment of the teeth 38 having the chevron-shaped feature are illustrated diagrammatically in FIGS. 8, 8A and 8B. FIG. 8 is a diagram of a section of the inner annular ring 16, showing the centerline of the shore which is coincident with the centerline of the inner annular ring 16. The annular width of the teeth 38 extends from a radius of 1.80 inches to a radius of 2.55 inches, with the valley of the teeth 38 being at a radius of 2.15 inches. As shown in FIG. 8A, the valley of the 38 describes a section of a helix centered at the centerline of the inner annular ring 16 and the pitch of the helix is 0.333θ, where θ is the pitch of the leading face 40 in degrees. The inwardly sloping faces 40a and 40b are at right angles to each other and inclined at 45 degrees to the line passing through each point in the valley and the centerline, as illustrated in FIG. 8B.

The inner annular ring 16 includes an outer, peripheral wall 46 that is of a uniform thickness. The chevron-shaped plateau 44 of the teeth are coplanar with the outer axial surface of the annular peripheral ring 46. Additionally, the guide arm 18 has a central throughbore 48 in which is received the nut and bolt combination 24 as described previously.

Figure 7A:
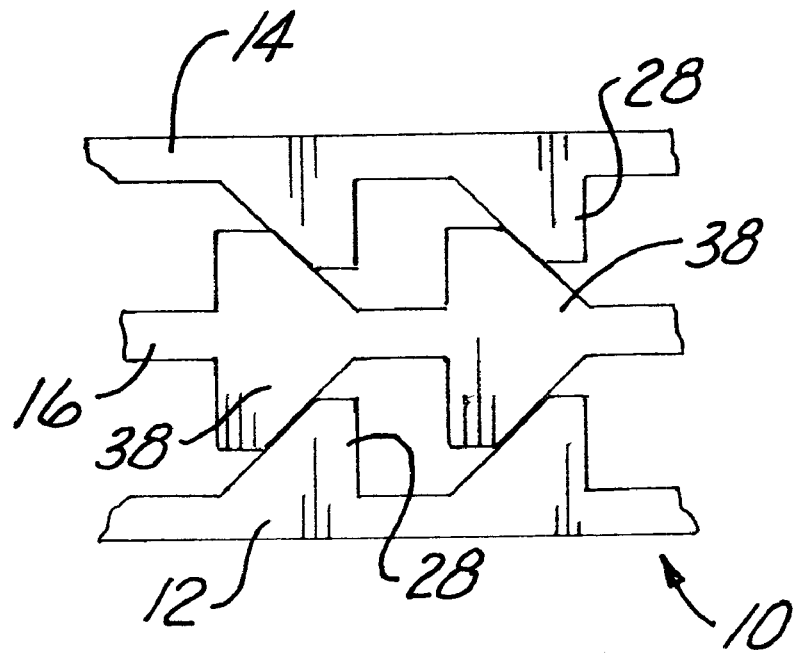
Figure 7B:
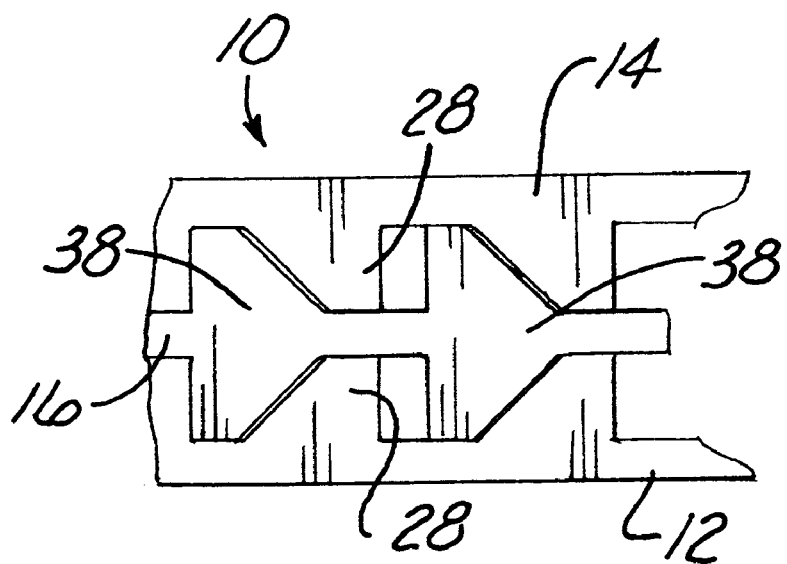

It will be appreciated that when the load relief coupling 10 is assembled, so that the inner annular ring 16 is positioned between the upper annular ring 14 and lower annular ring 12, the teeth 28 and 38 will engage each other such that relative circumferential movement of the inner ring 16 relative to the upper and lower annular rings 12 and 14 will cause the leading faces 30 and 40 of the teeth 28 and 38 to engage and slide relative to each other moving the load relief coupling 10 between the load position illustrated in FIG. 7a and the unload position illustrated in FIG. 7b. Additionally, the peaked radial cross-section of the teeth 28 and the valley radial cross-section of the teeth 38 will result in the axial rings 12–16 maintaining their relative coaxial alignment upon circumferential or pivotal movement.

The relief coupling is illustrated in its unloaded position in FIG. 1. Tightening of the nut and bolt combination coupler 24 will draw the lever arms 20 and 22 of the lower and upper annular rings toward the guide arm 18 of the inner annular ring 16. This will cause the teeth 28 to ride upwardly on the teeth 38 resulting in an increased separation of the lower annular ring 12 and upper annular ring 14, to the position illustrated in FIG. 3. The U-shaped keeper member 26 will prevent further displacement of the lower annular ring 12 and the upper annular ring 14.

The load relief coupling 10 is advantageously used in a concrete form shoring apparatus such as that illustrated in FIG. 2 generally at 48. The shoring apparatus 48 includes four supporting posts 50 and four corresponding supported posts 52 which are moveable relative to each other along their common axis. A load relief coupling 10 interconnects each of the supporting posts 50 and corresponding supporting post 52. In the particular shoring apparatus 48 illustrated in FIG. 2, a plurality of panels 54 are each interconnected to a pair of the supporting posts 50 to form a supporting apparatus 48 of a rectangular shape. The shoring apparatus 48 is used to support concrete formwork on the tops of the supported posts 52, most typically horizontally disposed formwork that is used for forming a horizontal building structural member such as a floor or ceiling.

As is common in the concrete form industry, the supported formwork must be held substantially rigidly in place while the concrete is poured and cured. After the concrete has set sufficiently, the formwork is stripped from the poured structure and moved to the next pouring location. Thus, the relative displacement between the supporting posts 50 and the supported post 52 must be held in the appropriate adjusted position while the concrete is poured and begins to set and yet they must be allowed to move relatively toward each other to reduce the overall height of the shoring apparatus 48 in order to strip the horizontally disposed formwork from the poured building member. While a wing nut 56 (FIG. 3) may be advantageously used for adjustment of the relative displacement of the supporting post 50 and the supported post 52 when there is no substantial load on the supported post 52, considerable force is required to rotate the wing nut 56 when the shoring apparatus 48 is being used to support a poured building component. Accordingly, a load relief coupling 10 is used to interconnect and adjust the relative displacement of the supporting post 50 and the supported post 52, as illustrated in FIG. 3. When setting the shoring apparatus 48 in position to pour the building component, the load relief coupling 10 is adjusted to its expanded width position, as illustrated in FIG. 3, by tightening of the nut and bolt combination 24. After the shoring apparatus 48 has been appropriately positioned and the concrete poured atop the supported formwork and cured, the supported post 52 may be quickly and easily displaced toward the supporting post, retrieving a substantial part of the load and either allowing the formwork to be stripped or permitting further displacement by adjustment of the wing nut.

While the teeth 28 and 38 of the preferred embodiment have been described as having a self-centering profile, teeth having flat mating surfaces may work suitably in certain circumstances.

Although the invention has been described with respect to a preferred embodiment thereof, it is to be also understood that it is not to be so limited since changes and modifications can be made therein which are within the full intended scope of this invention as defined by the appended claims.

I claim:

1. A load relief coupler for interconnecting and adjustably changing the distance of separation of a lower supporting member and an upper supported member comprising:

(a) a supporting coupler member;

(b) a supported coupler member; (c) an inner coupler member positioned between the supporting and supported coupler member;

(d) coacting teeth on the inner coupler member and on the supporting and supported coupler members;

(e) a connector for releasably holding the supporting coupler member and the supported coupler member relative to the inner coupler member in a position wherein said connecting teeth support the inner coupler member a spaced distance from the supporting coupler member and the supported coupler member a spaced distance from the inner coupler member; and (f) wherein release of the connector permits the supported coupler member to move toward the supporting coupler member.

2. A load relief coupler as defined in claim 1, wherein the first surface of the supporting member and the first surface of the supported member are substantially planar.

3. A load relief coupler as defined in claim 1, wherein the first surface of the supporting member and the first surface of the supported member are substantially helical.

4. A load relief coupler as defined in claim 1, wherein the connector is a nut and bolt combination.

5. A load relief coupler as defined in claim 1, further comprising a retainer for preventing axial displacement of the supported and supporting members beyond a predetermined distance.

6. A load relief coupler as destined in claim 1, wherein release of the connector permits the supported member to move toward the supporting member.

7. A load relief coupling for interconnecting and adjustably changing the distance of separation of a lower supporting member and an upper supported member, said coupling comprising:

(a) a supporting annular ring having a central axis, a first surface in contact engagement with the supported member, an opposing surface having a plurality of teeth arranged circumferentially and which project away from said first surface, and a radially extended lever arm;

(b) a supported annular ring having a central axis coincident with the central axis of the supporting ring and having a first surface in contact engagement with the supporting member, an opposing surface having a plurality of teeth arranged circumferentially and which project away from said first surface, and a radially extended lever arm;

(c) an inner annular ring positioned between the supporting and supported annular rings and having a first surface and an opposing, second surface, a plurality of oppositely projected teeth arranged circumferentially on each of said surfaces, and a radially extended guide arm;

(d) sloping surfaces on the teeth of the supporting ring having a first handed direction and sloping surfaces on the teeth of the supported ring having a handed direction that is opposite of the first handed direction;

(e) sloping surfaces on the teeth of the inner ring that arranged so as to mate with the sloping surfaces on the teeth of the corresponding supported and supporting annular ring;

(f) a connector that engages each of the lever arms and the guide arm to releasably hold the supported and supporting rings with the lever arms in a relatively close position wherein the teeth of the inner ring have ridden up the sloping surface of the corresponding adjacent teeth of the supporting ring and the teeth of the supported ring and the teeth of the supported ring to have ridden up the sloping surface of the corresponding adjacent teeth of the inner ring; and (g) wherein release of the connector allows the supported and supporting rings to pivot relative to each other and the inner ring about the central axis and thereby allowing the supported ring to move toward the supporting ring.

\* \* \* \* \*